United States Patent
Huo et al.

(10) Patent No.: US 7,956,955 B2
(45) Date of Patent: Jun. 7, 2011

(54) LIQUID CRYSTAL DISPLAY MODULE

(75) Inventors: Dongim Huo, Gumi-si (KR); Hyunseop Yun, Gumi-si (KR); Junghoon Park, Kyungwan-si (KR)

(73) Assignee: LG Display Co., Ltd., Seoul (KR)

( * ) Notice: Subject to any disclaimer, the term of this patent is extended or adjusted under 35 U.S.C. 154(b) by 229 days.

(21) Appl. No.: 12/314,262

(22) Filed: Dec. 5, 2008

(65) Prior Publication Data

US 2009/0153771 A1    Jun. 18, 2009

(30) Foreign Application Priority Data

Dec. 6, 2007   (KR) .................. 10-2007-0126137

(51) Int. Cl.
*G02F 1/1335* (2006.01)
(52) U.S. Cl. ...................................................... 349/70
(58) Field of Classification Search .............. 349/58, 349/62–65; 362/634
See application file for complete search history.

(56) References Cited

U.S. PATENT DOCUMENTS

| | | | | |
|---|---|---|---|---|
| 2004/0257792 A1* | 12/2004 | Yu et al. | ............... | 362/31 |
| 2006/0146512 A1* | 7/2006 | Choi | ............... | 362/29 |

FOREIGN PATENT DOCUMENTS

| | | |
|---|---|---|
| CN | 1651987 A | 8/2005 |
| CN | 1797119 A | 7/2006 |
| JP | 2006-32016 A | 2/2006 |

* cited by examiner

*Primary Examiner* — David Nelms
*Assistant Examiner* — Phu Vu
(74) *Attorney, Agent, or Firm* — McKenna Long & Aldridge LLP

(57) ABSTRACT

A liquid crystal display module includes: a liquid crystal display panel; a plurality of lamps that irradiates light to the liquid crystal display panel; a bottom cover that receives the plurality of lamps; a diffusion plate on the plurality of lamps, the diffusion plate diffusing the light irradiated by the lamps toward the liquid crystal display panel; and a pair of lamp guides each including a first frame member positioned perpendicular to the lamps on the bottom cover and at least one second frame member forming a predetermined angle with the first frame member, wherein a plurality of supports for supporting the diffusion plate are fastened on each of the first frame member and the second frame member.

8 Claims, 7 Drawing Sheets

LIQUID CRYSTAL DISPLAY MODULE

This application claims the benefit of Korea Patent Application No. 10-2007-0126137 filed on Dec. 6, 2007, which is incorporated herein by reference for all purposes as if fully set forth herein.

BACKGROUND OF THE INVENTION

1. Field of the Invention

The present invention relates to a liquid crystal display module, and more particularly, to a liquid crystal display module capable of reducing the manufacturing cost and improving the manufacturing efficiency.

2. Discussion of the Related Art

In the recent information society, the importance of display devices serving as a visual information medium is increasing. However, it was a large problem in cathode ray tubes or television tubes that were mainly used as the display device in that their weight and the size were large. Accordingly, many kinds of flat panel display devices have been recently developed so as to solve the problems of the cathode ray tubes or the television tubes.

Examples of the flat panel display devices include a liquid crystal display (LCD), a field emission display (FED), a plasma display panel (PDP), and an electro-luminescence (EL). Most of the flat panel display devices have been put to practical use and have been put on the market.

Out of the flat panel display devices, the application range of the liquid crystal display has widened because the liquid crystal display can be manufactured to be light and thin and can be driven under low power consumption. Accordingly, the liquid crystal display has been used as a personal computer such as a notebook PC, an office automation equipment, an audio/video equipment, an interior/outdoor advertising display device. The liquid crystal display displays a desired image on the screen by controlling the transmission amount of light beam depending on video signals applied to a plurality of control switches arranged in a matrix format. The liquid crystal display has rapidly grown to be the large-sized liquid crystal display with the high-resolution because of a technology for the mass production and the research and development.

Generally, the liquid crystal display includes a liquid crystal display module and a driving circuit unit for driving the liquid crystal display module.

The liquid crystal display module includes a liquid crystal display panel in which liquid crystal cells are arranged between two glass substrates in a matrix format, and a backlight unit providing light to the liquid crystal display panel. The liquid crystal display module includes optical sheets that allow light traveling from the backlight unit to the liquid crystal display panel to travel in a vertical direction. The liquid crystal display panel, the backlight unit, and the optical sheets have to be fastened in an integrated form so as to prevent the loss of light, and also have to be protected from an external impact. For this, the backlight unit including edges of the liquid crystal display panel and a liquid crystal display case surrounding the optical sheets are provided.

The backlight unit of the liquid crystal display module may be classified into a direct-light type backlight unit and an edge-light type backlight unit. In the edge-light type backlight unit, a fluorescent lamp is installed outside a flat panel and emits light to the entire surface of the liquid crystal display panel using a transparent light guide plate. In the direct-light type backlight unit, a light source is installed in the rear of the liquid crystal display panel and directly provides light to the liquid crystal display panel. Because several light sources are installed in the direct-light type backlight unit as compared with the edge-light type backlight unit, a luminance of the liquid crystal display can increase and a light emitting surface can widen. Therefore, in case the large-screen liquid crystal display panel such as a LCD TV is required, the direct-light type backlight unit is generally used in the liquid crystal display module.

A related art direct-light type backlight unit includes a plurality of lamps providing a liquid crystal panel with light, a bottom cover receiving the plurality of lamps, a diffusion plate that is positioned to cover the entire surface of the bottom cover and diffuses the light emitted from the plurality of lamps to irradiate the diffused light to a liquid crystal display panel, and a plurality of optical sheets stacked on the diffusion plate. The diffusion plate diffuses the light emitted from the plurality of lamps toward a front direction of the liquid crystal display panel, and thus uniforms the distribution of the light irradiated to the liquid crystal display panel. The diffusion plate is formed by coating a light diffusion member on both surfaces of a film formed of a transparent resin.

In the related art direct-light type backlight unit, a large amount of heat is generated by cold cathode fluorescent lamps used as the lamp, and the diffusion plate hangs down by the heat as well as the influence of gravity. If the diffusion plate hangs down, the diffusion amount of light in a hang-down portion of the diffusion plate is different from the diffusion amount of light in a non-hang down portion of the diffusion plate. Hence, the amount of light irradiated to the liquid crystal display panel is not uniform, and even bright lines may appear in the lamps.

Accordingly, a plurality of lamp guides capable of fixing the lamps and preventing the hang down of the diffusion plate were proposed.

However, as a large number of lamps are used in the liquid crystal display module in accordance with the recent market trend toward the large-screen liquid crystal displays and the length of the lamps used in the liquid crystal display module becomes longer, heat generated by the lamps increases. Therefore, a large number of lamp guides are required so as to prevent the hang down of the diffusion plate.

As the number of lamp guides increases, the manufacturing cost of the liquid crystal display module increases, and also a manufacturing process is complicated to cause a reduction in the manufacturing efficiency.

SUMMARY OF THE INVENTION

Accordingly, the present invention is directed to a liquid crystal display module that substantially obviates one or more of the problems due to limitations and disadvantages of the related art.

An advantage of the present invention is to provide a liquid crystal display module capable of reducing the manufacturing cost and improving the manufacturing efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display module includes a liquid crystal display panel, a plurality of lamps that irradiates light to the liquid crystal display panel, a bottom cover that receives the plurality of lamps, a diffusion plate on the plurality of lamps, the diffusion plate diffusing the light irradiated by the lamps toward the liquid crystal display panel, and a pair of lamp guides each including a first frame member positioned perpendicular to the lamps on the bottom cover and at least one second frame member forming a predetermined angle with the first frame member, wherein a plurality of supports for supporting the diffusion plate are fastened on each of the first frame member and the second frame member.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
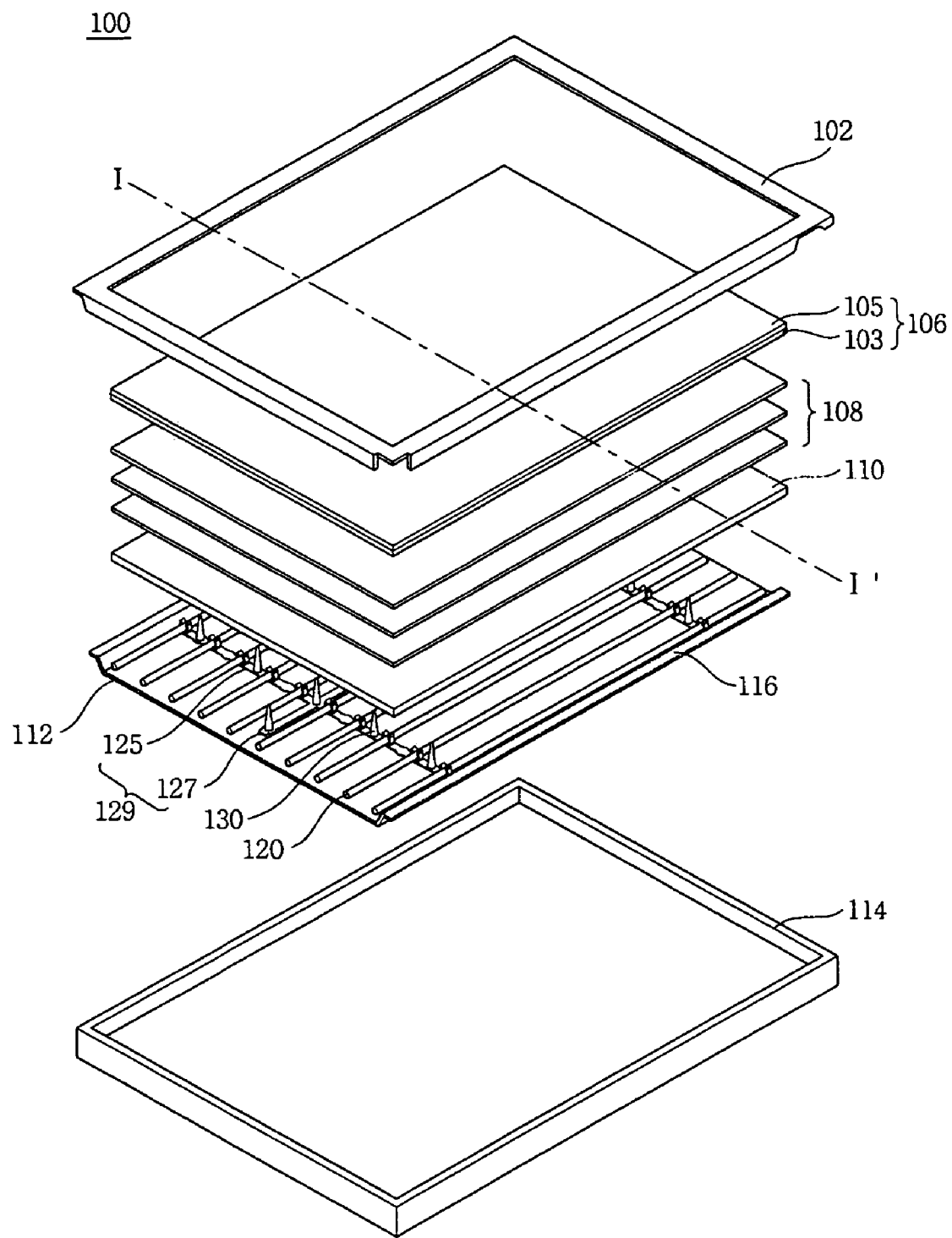
FIG. 1 is a perspective view of a liquid crystal display module according to an exemplary embodiment of the invention.
Figure 2:
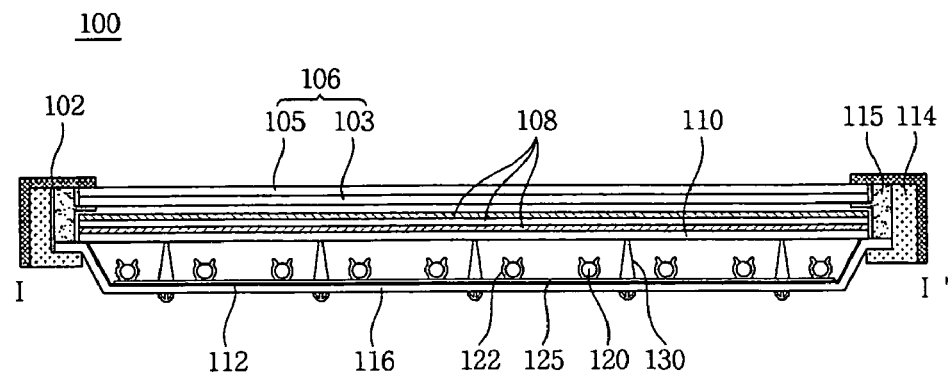
FIG. 2 is a cross-sectional view taken along line I-I' of FIG. 1.

FIG. 1 is a perspective view of a liquid crystal display module 100 according to an exemplary embodiment of the invention, and FIG. 2 is a cross-sectional view taken along line I-I' of FIG. 1.

As shown in FIGS. 1 and 2, the liquid crystal display module 100 includes a support main 114, a backlight unit and a liquid crystal display panel 106 stacked inside the support main 114, and a top case 102 surrounding edges of the liquid crystal display panel 106 and sides of the support main 114.

The liquid crystal display panel 106 includes an upper substrate 105, a lower substrate 103, and a spacer (not shown) for keeping an interval between the upper substrate 105 and the lower substrate 103 constant. Liquid crystals are interposed between the upper substrate 105 and the lower substrate 103. The upper substrate 105 may include a color filter (not shown), a common electrode (not shown), a black matrix (not shown), and the like. The lower substrate 103 may include signal lines (not shown) such as data line and gate lines, a thin film transistor (not shown) at each crossing of the data lines and the gate lines, and the like. The thin film transistor switches on and off a data signal to be transmitted from the gate lines to liquid crystal cells in response to a scan signal (gate pulse) received through the gate lines. A pixel electrode is formed in a pixel area between the data lines and the gate lines. A pad area is formed at one side of the lower substrate 103 to be connected to the data lines and the gate lines. A tape carrier package (not shown) provided with a driver integrated circuit (IC) for applying a driving signal to the thin film transistor is attached to the pad area. The tape carrier package supplies the data signal received from the driver IC to the data lines and supplies the scan signal to the gate lines. An upper polarization sheet is attached to the upper substrate 105, and a lower polarization sheet is attached to a rear surface of the lower substrate 103.

The support main 114 is a mold, and a side wall surface of the support main 114 inside the support main 114 is molded into a stepped jaw surface. The backlight unit providing light to the liquid crystal display panel 106 and the liquid crystal display panel 106 are stacked on the stepped jaw surface.

The backlight unit includes a plurality of lamps 120 providing light to the liquid crystal display panel 106, lamp guides 129 that fixes the lamps 120 and supports a diffusion plate 110, a bottom cover 116 for receiving the lamps 120, the diffusion plate 110 that covers the entire surface of the bottom cover 116 and diffuses light emitted from the lamps 120 to irradiate the diffused light to the liquid crystal display panel 106, and a plurality of optical sheets 108 on the diffusion plate 110.

Examples of the lamp 120 include a cold cathode fluorescent lamp and an external electrode fluorescent lamp. Each lamp 120 may include a glass tube, inert gases inside the glass tube, and an anode and a cathode respectively installed at both ends of the glass tube. More specifically, the glass tube is filled with the inert gases, and a phosphor is coated on inner walls of the glass tube. The lamps 120 are fixed by the lamp guides 129 and positioned on the bottom cover 116.

The bottom cover 116 has a bottom surface and a slope surface extended from the bottom surface. In other words, the bottom surface and the slope surface of the bottom cover 116 are stepped. A reflective sheet 112 is attached to the bottom surface and the slope surface of the bottom cover 116. The reflective sheet 112 may be formed of a material capable of reflecting light and is attached to the bottom surface and the slope surface of the bottom cover 116 using a double sided adhesive tape (not shown). The reflective sheet 112 reflects light traveling from the plurality of lamps 120 toward the bottom cover 116, and thus allows the reflected light to travels toward the liquid crystal display panel 106. Hence, the efficiency of light incident on the liquid crystal display panel 106 can be improved.

Each lamp guide 129 includes a first frame member 125 positioned perpendicular to the lamp 120 on the bottom cover 116, and at least one second frame member 127 forming a predetermined angle with the first frame member 125.

Figure 3A:
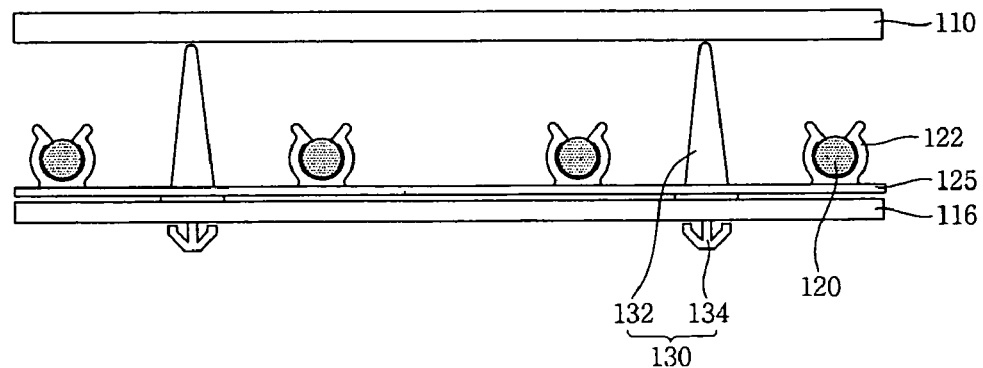
FIG. 3A is a cross-sectional view of a first frame member for explaining the fastening of lamp guides to supporters.
Figure 3B:
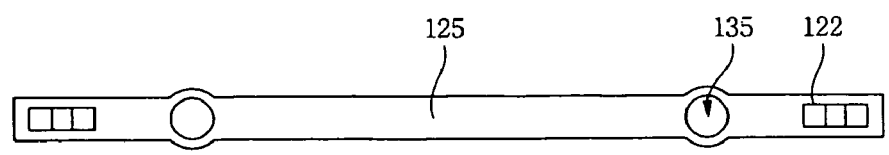
FIG. 3B shows fastening grooves formed in the first frame member.

As shown in FIG. 3A, a plurality of lamp holders 122 for mounting and fixing the lamps 120 are formed on the first frame member 125. A plurality of supports 130 for supporting the diffusion plate 110 are fastened on the first frame member 125. The lamp holder 122 has a form capable of surrounding the lamp 120 and fixes the lamp 120 on the bottom cover 116. Each support 130 includes a supporting unit 132 for supporting the diffusion plate 110 and a fastening unit 134 for fastening the support 130 to the bottom cover 116. As shown in FIG. 3B, the first frame member 125 has fastening grooves 135 capable of passing through the fastening unit 134. The fastening unit 134 passes through the fastening groove 135 and the bottom cover 116 to tightly fix the lamp guide 129 on the bottom cover 116. The fastening unit 134 may have a flexible anchor shape for the easy fastening.

Although it is not shown, the plurality of supports 130 for supporting the diffusion plate 110 are fastened on the second frame member 127. For this, the second frame member 127 has fastening grooves 135 capable of passing through the fastening unit 134 of the support 130.

The lamp guides 129 are positioned between the bottom cover 116 and the lamps 120 and may be formed in pairs so as to fix the lamps 120 and support the diffusion plate 100. It is preferable that the lamp guides 129 are a mold and are formed using a polymer, that is, a polycarbonate material obtained repeatedly performing a carbonate bonding inside main chains of molecules. The location and the structure of the lamp guides 129 will be described later with reference to FIGS. 4 to 8.

The diffusion plate 110 and a panel guide 115 for supporting the liquid crystal display panel 106 are safely received on the lamp guides 129. The diffusion plate 110 diffuses light emitted from the plurality of lamps 120 and uniforms the distribution of light irradiated to the liquid crystal display panel 106. The diffusion plate 110 is formed by coating a light diffusion member on both surfaces of a film formed of a transparent resin. The diffusion plate 110 is supported by the supporters 130 fastened to the first and second frame members 125 and 127, and thus does not hang down even if the diffusion plate 110 is affected by gravity and lamp heat.

The panel guide 115 has a safe receiving part of a rectangular band shape, inside which the liquid crystal display panel 106 is safely received, and supports the liquid crystal display panel 106.

The plurality of optical sheets 108 stacked on the diffusion plate 110 change light emitted from the diffusion plate 110 in a direction perpendicular to the liquid crystal display panel 106 to improve the light efficiency. For this, the plurality of optical sheets 108 may include two prism sheets for changing a traveling angle of diffusion light emitted from the diffusion plate 110 in a direction perpendicular to the liquid crystal display panel 106, and a diffusion sheet for diffusing the light passing through the two prism sheets.

The top case 102 is manufactured in a rectangular band form having a plane portion and a side portion which are bent at right angles to surround the edges of the liquid crystal display panel 106 and the sides of the support main 114.

Figure 4:
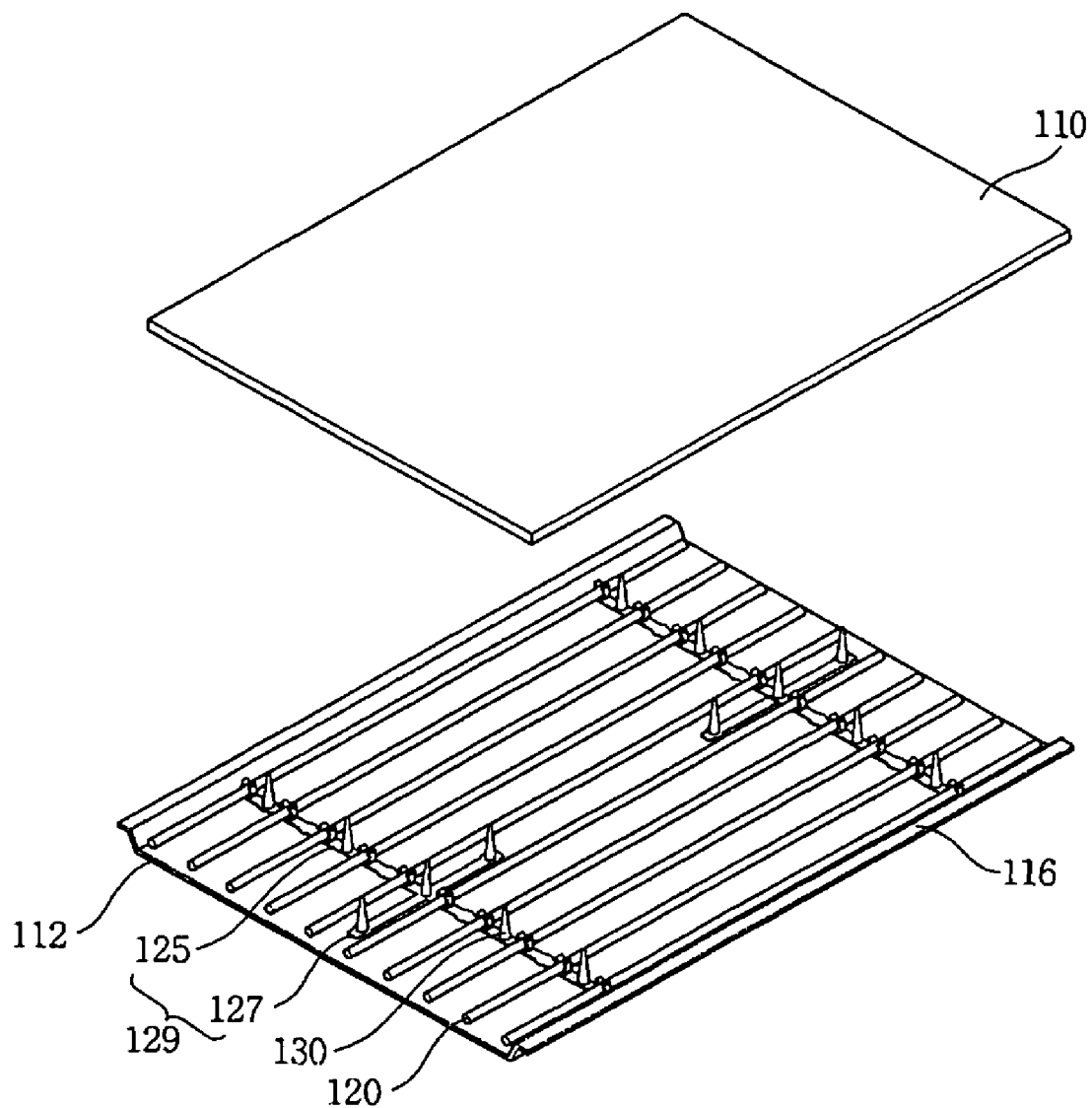
FIG. 4 is a plane view for explaining a disposition of the lamp guides

FIG. 4 is a plane view for explaining a disposition of the lamp guides. FIGS. 5 to 8 are perspective views of first to fourth implementations of a structure of the lamp guide, respectively.

As shown in FIG. 4, the lamp guides 129 are formed in pairs between the bottom cover 116 and the diffusion plate 110. Each lamp guide 129 includes the first frame member 125 positioned perpendicular to the lamp 120, and the at least one second frame member 127 positioned between the lamps 120 at a predetermined angle with the first frame member 125. As above described, the plurality of lamp holders 122 for mounting and fixing the lamps 120 are formed on the first frame member 125. The plurality of supports 130 for supporting the diffusion plate 110 are fastened on the first frame member 125. The plurality of supports 130 for supporting the diffusion plate 110 are fastened on the second frame member 127.

The lamp guide 129 may have various structures so as to efficiently prevent the hang down of the diffusion plate 110.

Figure 5:
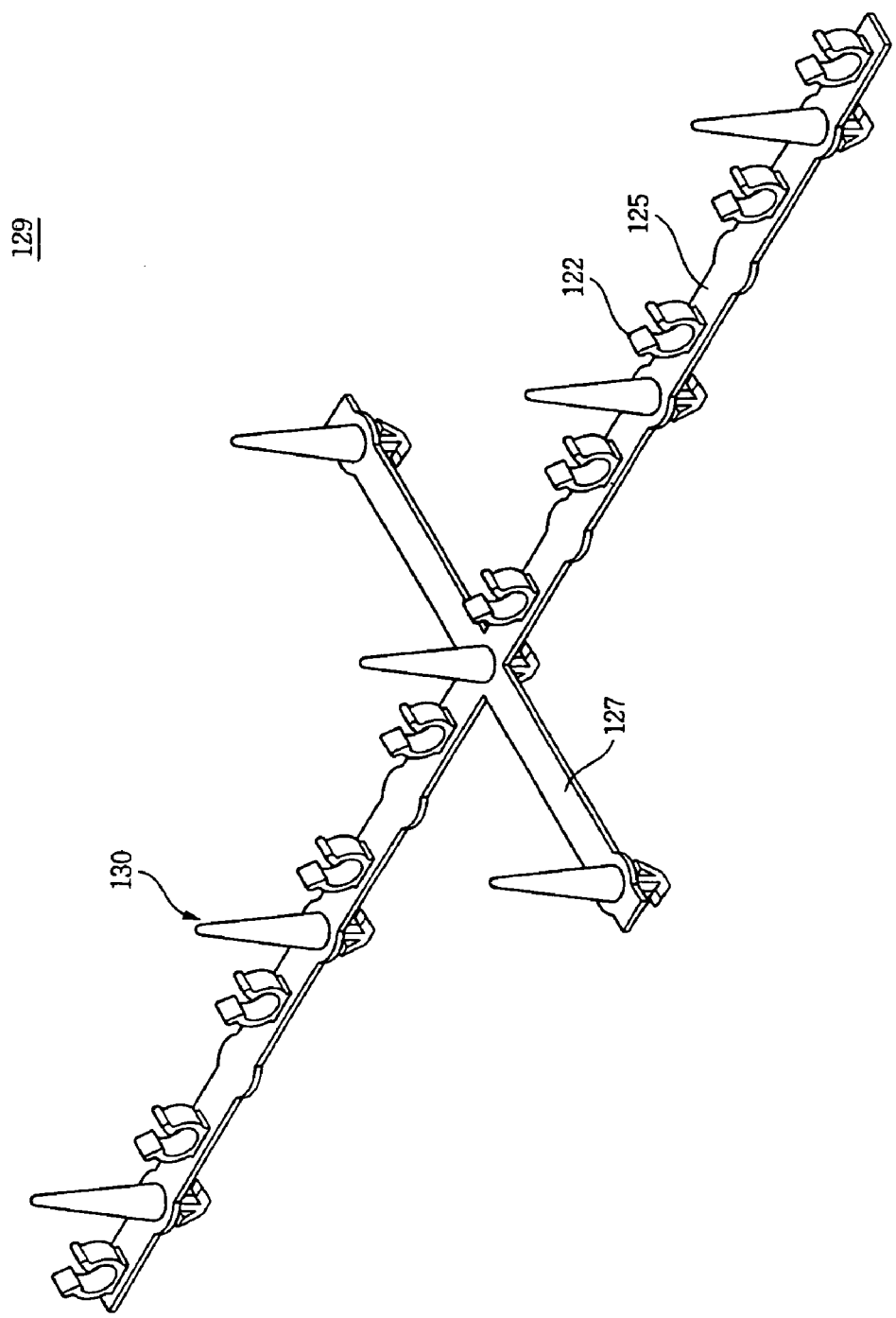
FIG. 5 is a perspective view of a first implementation of a structure of the lamp guide.
Figure 6:
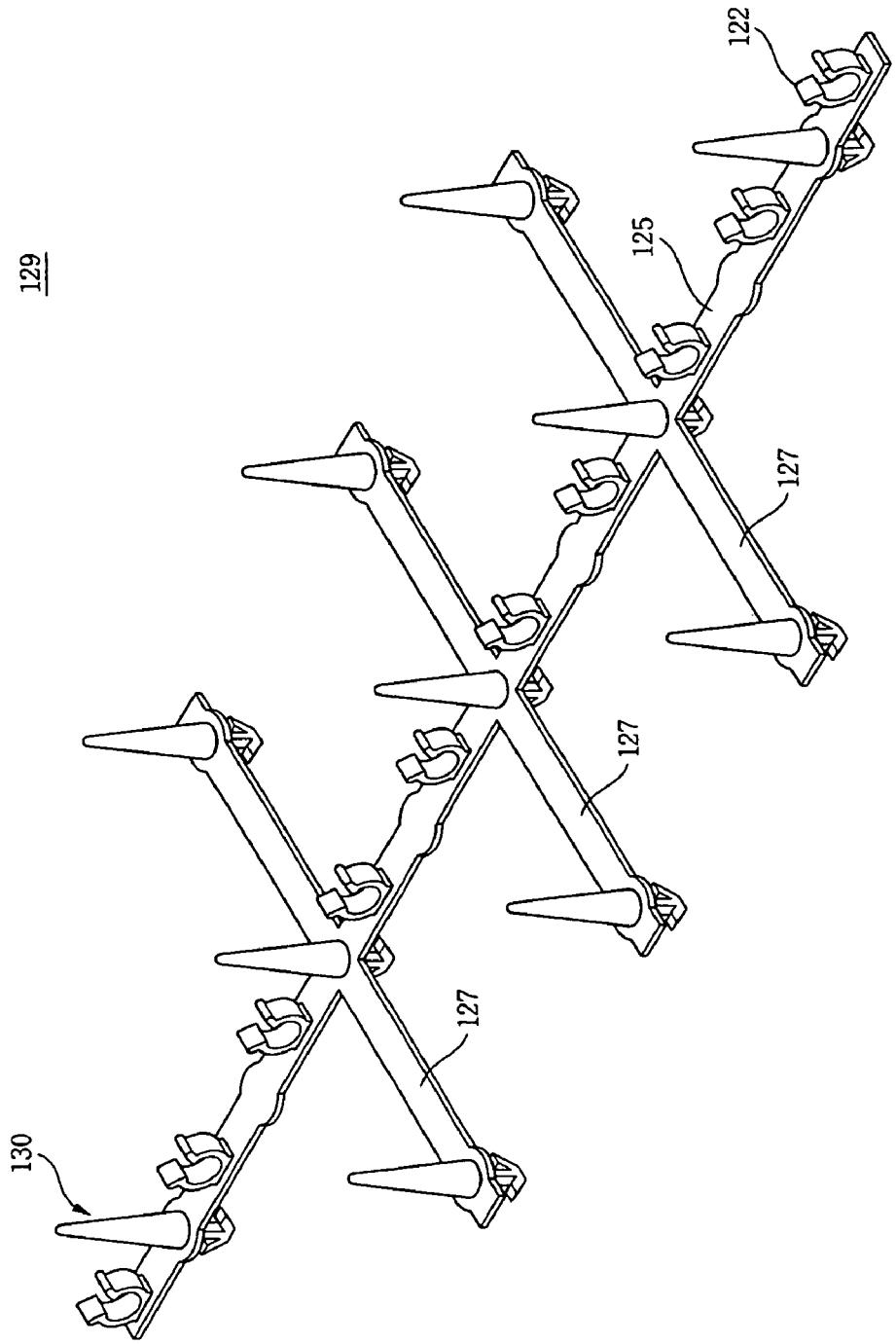
FIG. 6 is a perspective view of a second implementation of a structure of the lamp guide.

For example, as shown in FIG. 5, the lamp guide 129 may have the first frame member 125 and one second frame member 127 crossing the first frame member 125 at right angles. As shown in FIG. 6, the lamp guide 129 may have the first frame member 125 and the plurality of second frame members 127 crossing the first frame member 125 at right angles.

Figure 7:
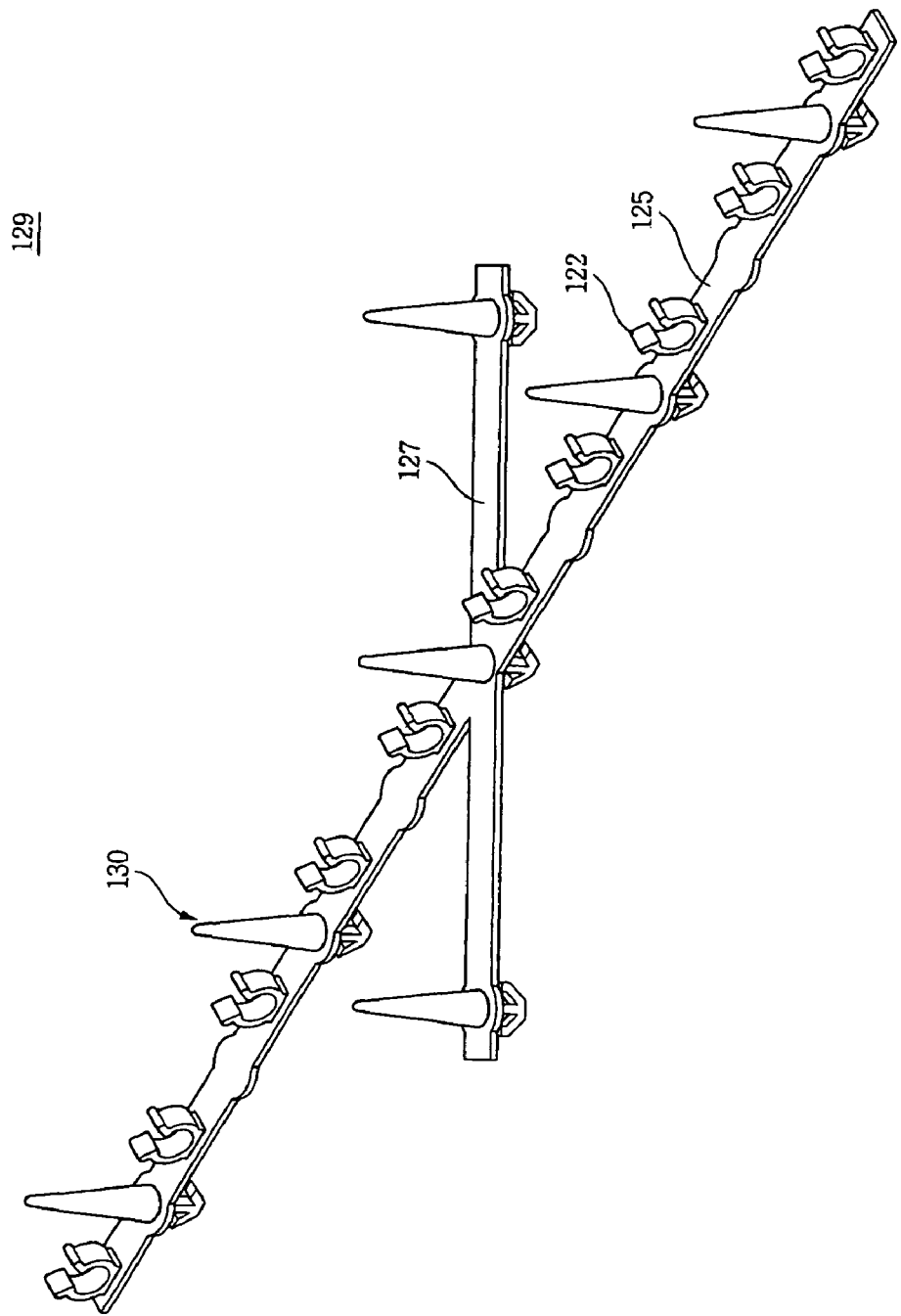
FIG. 7 is a perspective view of a third implementation of a structure of the lamp guide.

As shown in FIG. 7, the lamp guide 129 may have the first frame member 125 and one second frame member 127 that forms an angle of inclination with the first frame member 125. Although it is not shown, the lamp guide 129 may have the first frame member 125 and the plurality of second frame members 127 that form an angle of inclination with the first frame member 125.

Figure 8:
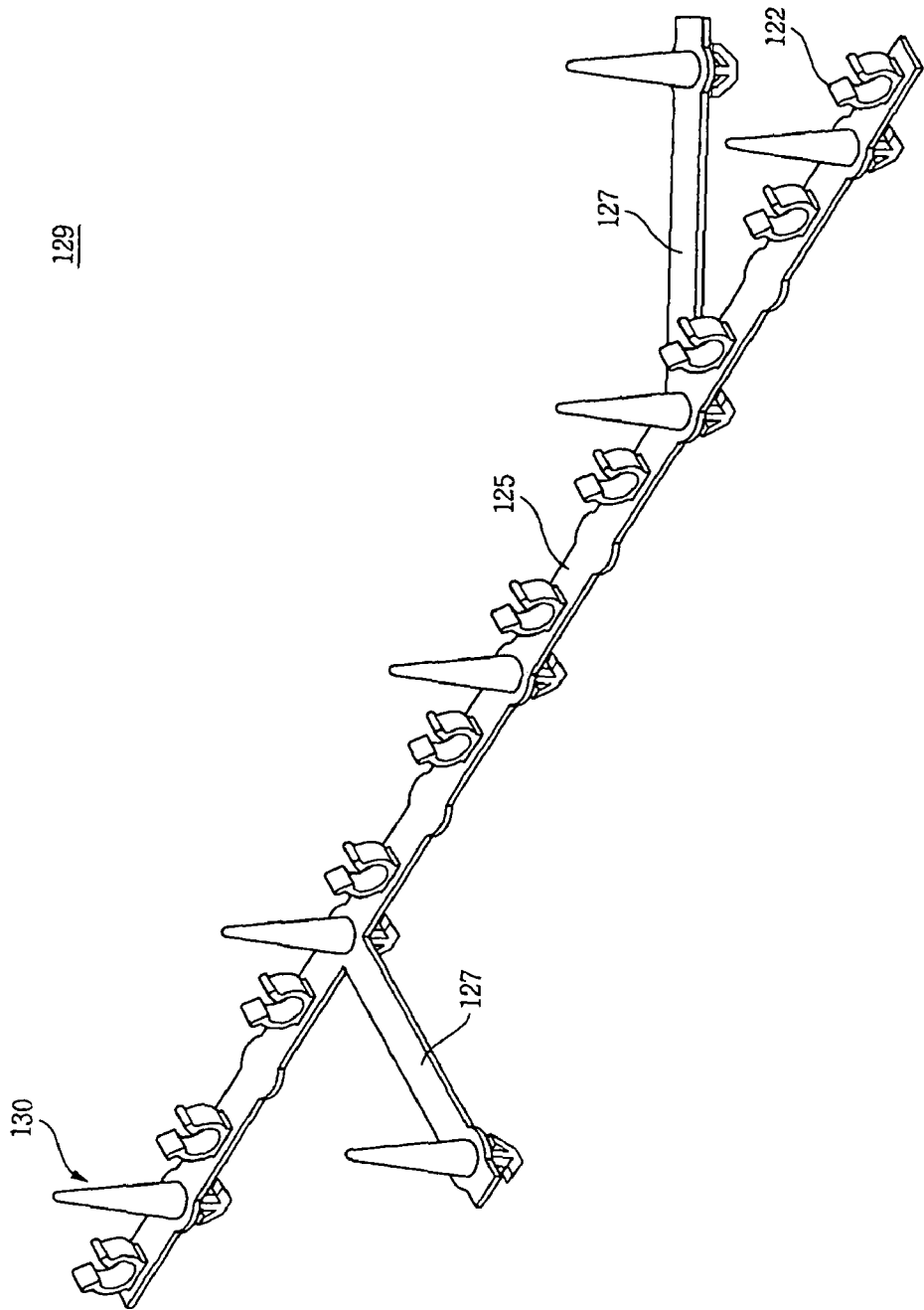
FIG. 8 is a perspective view of a fourth implementation of a structure of the lamp guide.

As occasion demands, the lamp guide 129, as shown in FIG. 8, may have the first frame member 125 and the at least one second frame member 127 that forms a right angle or an angle of inclination with the first frame member 125 and crosses the first frame member 125.

Although it is not shown, the lamp guide 129 may have a mixed structure of the structures shown in FIGS. 5 to 7.

The length of the second frame member 127 and an angle between the first and second frame members 125 and 127 that determine the structure of the lamp guide 129 may be experimentally determined after observing on the hang down of the diffusion plate 110.

As described above, the liquid crystal display module according to the exemplary embodiment of the invention prevents the hang down of the diffusion plate using the pair of lamp guides which is positioned between the bottom cover and the diffusion plate and on which the plurality of supports are fastened, and thus can greatly reduce the manufacturing cost as compared with the related art which prevents the hang down of the diffusion plate using a large number of lamp guides.

Furthermore, the liquid crystal display module according to the exemplary embodiment of the invention allows the pair of lamp guides to be easily fastened to the bottom cover by improving the fastening structure of the supports, and thus can increase the manufacturing efficiency.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module comprising:
   a liquid crystal display panel;
   a plurality of lamps that irradiates light to the liquid crystal display panel;
   a bottom cover that receives the plurality of lamps;
   a diffusion plate on the plurality of lamps, the diffusion plate diffusing the light irradiated by the lamps toward the liquid crystal display panel; and
   a pair of lamp guides each including a first frame member positioned perpendicular to the lamps on the bottom cover and at least one second frame member positioned between the lamps at a predetermined angle with the first frame member,
   wherein a plurality of supports for supporting the diffusion plate are fastened on each of the first frame member and the second frame member,
   wherein a plurality of lamp holders for mounting and fixing the lamps are formed on the first frame member.

2. The liquid crystal display module of claim 1, wherein each of the first frame member and the second frame member includes fastening grooves used to fasten the supports, and the fastening grooves are spaced apart from each other at a constant interval therebetween.

3. The liquid crystal display module of claim 2, wherein each of the supports includes a supporting unit for supporting the diffusion plate and a fastening unit that passes through the fastening groove to fasten the bottom cover to the pair of lamp guides.

4. The liquid crystal display module of claim 3, wherein the fastening unit has a flexible anchor shape.

5. The liquid crystal display module of claim 1, wherein the second frame member forms a right angle with the first frame member.

6. The liquid crystal display module of claim 1, wherein the second frame member forms an angle of inclination with the first frame member.

7. The liquid crystal display module of claim 1, wherein the second frame members form an angle of inclination with the first frame member and cross the first frame member.

8. The liquid crystal display module of claim 1, wherein the pair of lamp guides are molded using a polycarbonate material.

* * * * *